July 14, 1959 J. R. EMERSON ET AL 2,894,740
DASHPOT
Filed April 2, 1956

John R. Emerson
Golden W. Fuller
Audley G. Richards
INVENTORS

United States Patent Office 2,894,740
Patented July 14, 1959

2,894,740
DASHPOT

John R. Emerson, Golden W. Fuller, and Audley G. Richards, Flint, Mich.

Application April 2, 1956, Serial No. 575,383

18 Claims. (Cl. 267—1)

This invention relates to motion retarding devices of general application and pertains to subject matter which is similar to that disclosed in U.S. Patent No. 2,862,702 granted on December 2, 1958.

An object of the present invention is to provide an improved dashpot which may be used in many environments, one of which is a speed and/or load control for an engine. At the present time there are many uses for dashpots, and therefore it is impractical to mention each. Some are in connection with the speed and/or load control of an engine, for example the engine carburetor or fuel injector, electrical switches and others.

As in most products cost of production is of importance and any improvements which are made in the product accompanied by an actual savings in production cost are of importance. In the manufacture of dashpots that are used with engine speed and/or load controls, inexpensive methods of obtaining a reasonably accurate metering adjustment have been attempted. One of the principal objects of the present invention is to provide a dashpot of the type under discussion which has an improvement in the metering system such that the desired metering orifice dimension may be selected to provide accurate metering in production and in addition, the construction is such as to allow salvage of the dashpots to correct the improper metering. This is accomplished by the use of an inclined groove in a specially constructed plunger, the inclined groove having a metering plug selectively positioned thereon so that the effective cross-sectional area orifice formed by a part of the inclined groove and a wall of the metering plug, may be obtained by merely pushing the plug into the bore of the plunger which has the inclined groove in it.

A further object of the invention is to provide a dashpot whose internal plunger is supported at both ends by means of guides so that the alignment of the means operating the dashpot plunger is less critical than with prior dashpots. In this way the direction of application of operating force for the dashpot may vary through a rather wide range without having binding or misalignment.

One of the important features of the dashpot is the plunger construction and the materials from which the plunger is made. By using a plastic material, such as a properly selected synthetic resin that has the necessary characteristics, the metering plug may be forced into the guide member bore having the tapered groove to any depth and the mere pressing of the plug in the groove provides such a strong frictional bond that no further fastening means are necessary in holding the plug in place. This allows a variable penetration of the plug and permits it to be removed or readjusted for salvage and improper metering correction. Moreover, there is an operating device for the plunger adapted to be connected with or at least contacted by the engine speed and/or load controls. It is a stem which, when connected to the plastic plunger, is held in place by sharp edges of the stem biting into the plastic of the plunger and preventing withdrawal of the stem, thereby providing a simple and secure fastening for the stem to the plunger.

The construction of the dashpot which exemplifies one embodiment of the invention, is designed to provide long satisfactory service, and structural arrangements in the dashpot are made to eliminate possible sources of difficulty. For example, the dust shield on the dashpot actuating stem is on the interior of the plunger return spring so that any abrasion-caused rubber particles fall harmlessly rather than enter the metering system.

Other objects and features of importance will become apparent in following the description of the illustrated form of the invention wherein.

Figure 1:
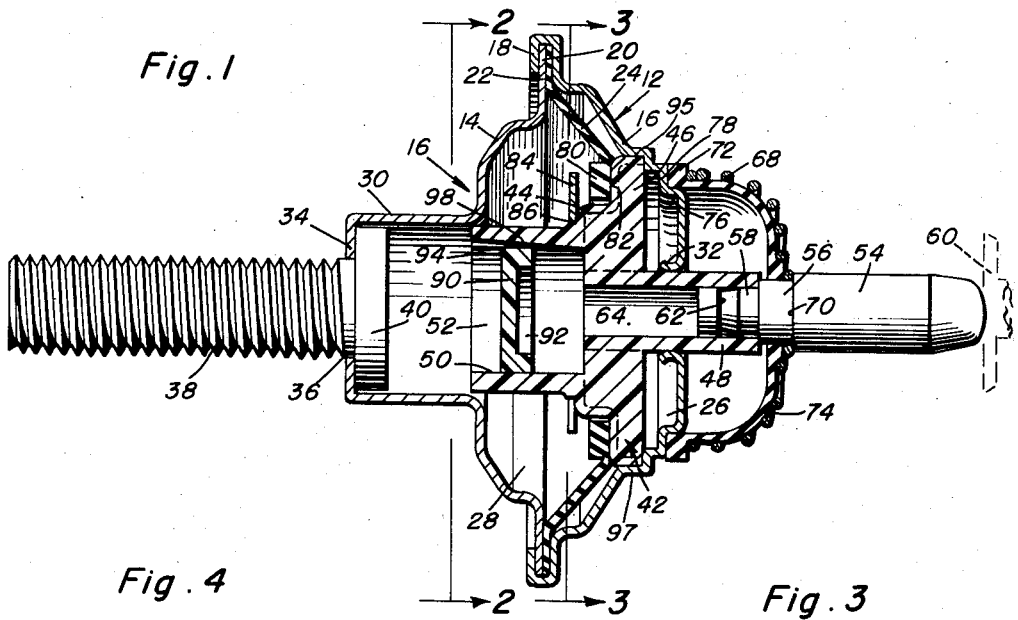
Figure 1 is a longitudinal sectional view of a dashpot which is constructed in accordance with the invention.
Figure 4:
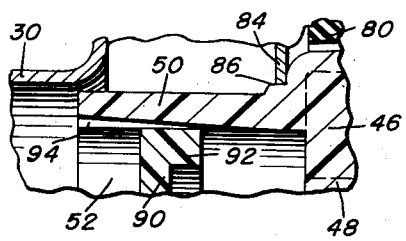
Figure 4 is a fragmentary enlarged sectional view showing the inclined metering groove and metering plug coacting therewith to form a metering orifice that is adjusted by the depth of penetration of the metering plug in the bore of one of the guide members of the plunger.

As seen best in Figure 1 the dashpot 10 has a casing 12 made of two covers 14 and 16 respectively. These covers are crimped together along confronting edges 18 and 20, and the peripheral part 22 of a diaphragm 24 is crimped therewith. This supports the diaphragm around its edge and mounts it in the hollow casing 12 in such a position that it separates the casing into two chambers 26 and 28. Cover 14 has a guide 30 which extends therefrom, while the cover 16 has a guide 32 which protrudes inwardly of it. Guide 30 is preferably formed as a cylinder with an end wall 34 in it, the latter being apertured as at 36 so that the shank of bolt 38 may be passed through it. The head 40 of the bolt is located on the interior of the guide 30 and is projection welded or otherwise fixed in place. Bolt 38 functions to support the dashpot 10 in proper relationship to the mechanical element 60 which actuates it, this element schematically representing any moving mechanical part whose motion is to be arrested. Guide 32 is made of an annular wall that extends inwardly of the hollow casing 12 and is coaxially aligned with cylindrical guide 30.

Plunger 42 is disposed in hollow casing 12. It is made of a synthetic resinous material having reasonable tensile and impact strength at normal temperatures. A series of polyamide resins made by the polymerization of hexamethylenediamine salt of adipic acid (nylon) may be selected, most of the silicone resins or a plastic selected from the epoxide group are suitable. Molded nylon functions very satisfactorily as plunger 42. The plunger comprises a shell 44 having a plurality of radially arranged ribs 46 connected at their ends to the shell and extending inwardly to a center at which there is a tubular guide member 48. A second guide member 50 in the form of a sleeve is fixed with the shell 44 and has a bore 52. The means for actuating the plunger 42 comprise stem 54 having a reduced portion 56 between the outer end and the inner, further reduced end 58. The outer end of stem 54 is adapted to be contacted by mechanical element 60, and inner reduced end 58 is undercut to form a sharp annular projection 62 in it which bites into the material that forms the bore 64 of guide member 48. The tubular guide member 48 is described as such in that it passes through guide 32 and thereby constrains the motion of the plunger 42 on one side of the plunger. Accordingly guide 32 functions as a bearing for the plunger. In addition the guide member 50 slides in the bore of guide 30 and functions to support the plunger 42 from the opposite side of it.

Movement of the plunger 42 in one direction is achieved by movement of the element 60. However, return movement of the plunger is obtained by a spring 68 which seats at one end on shoulder 70 formed between the reduced portion 56 of stem 54 and the outer end of the stem. The opposite end of spring 54 is disposed on a bead 72 around the periphery of flexible dust shield 74, the latter being made of rubber or a suitable plastic. This dust shield fits behind the outer coil of spring 68 and on the two right angular shoulders 76 and 78 on cover 16. Accordingly, any rubber particles which are abraded from shield during the flexing of spring 68 fall from the exterior of the dashpot and do not enter its metering system.

Figure 3:
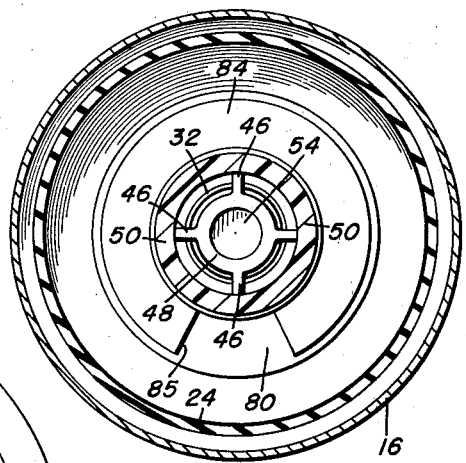
Figure 3 is a transverse sectional view taken on the line 3—3 of Figure 1.
Figure 2:
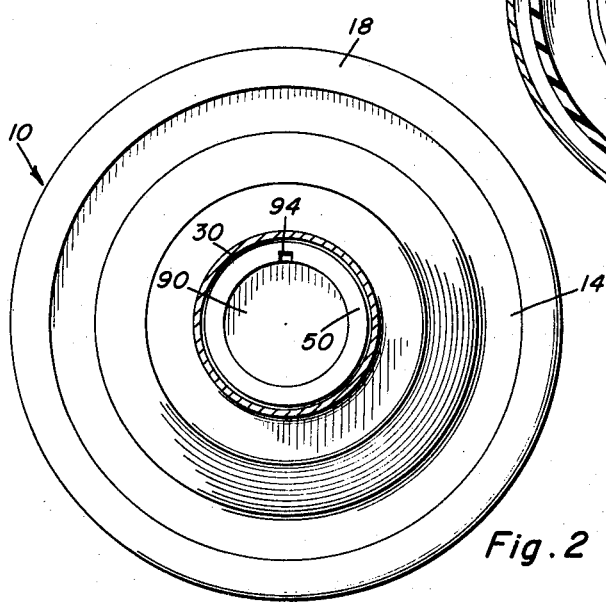
Figure 2 is a transverse sectional view taken on the line 2—2 of Figure 1.

The outer edge of diaphragm 24 is crimped in place with the edges 18 and 20 of covers 14 and 16. The inner edge of the diaphragm has a bead 80 which is pressed firmly against wall 82 on the front face of plunger 42 when diaphragm 24 is moved to the left as shown in Figure 1. Wall 82 is perpendicular to the path of movement of the plunger in the hollow casing 12. An approximately circular retaining washer 84 is disposed on a small shoulder 86 which is formed on the plunger 42 at the root of guide member 50. Retaining washer 84 has an opening 85, as shown in Figure 3, for two reasons. First to provide an opening to allow air to pass from chamber 26 to chamber 28 when the plunger 42 is returning to the position shown in Figure 1, when the bead 80 of diaphragm 24 is drawn against retaining washer 84 and secondly to facilitate assembly of the steel or other stiff material in washer 84, on the relatively soft material in plunger 42. The washer 84 is spaced slightly from the bead 80 of the diaphragm 24, and the diameter of the central aperture of the bead which fits around the plunger 42 is enlarged several thousandths of an inch to provide for a breathing of the diaphragm. Inasmuch as the bore 52 of guide member 50 is circular in cross-section, there is a circular metering disk 90 disposed in it. This metering disk has a skirt 92 rising therefrom which is adapted to fit flush against the inner surface of the guide member 52. A tapered metering groove 94 extends longitudinally down the wall of bore 52. Therefore the metering plug 90 is used to select the desired cross-sectional area of orifice formed from a selected part of the groove 94 by pushing the metering plug 90 a selected distance into the bore of guide member 50.

In the reciprocatory movement of plunger 42 there is at all times a constraining feature that holds the plunger 42 to a straight path of travel. Guides 30 and 32 coact with the guide members 50 and 48 respectively as does the outer surface 95 of plunger 42 when sliding into the annular collar 97 formed in the cover 16 between the ends thereof. The illustration of Figure 1 has the plunger 42 located in this collar 97.

In operation, dashpot 10 is mounted in accordance with the prerogative of the manufacturer. It is suggested that the bolt 38 be in such position that the stem 54 is in alignment with the dashpot actuating means 60. Dashpot 10 is designed primarily to have air as its operating fluid. In addition, a closed circuit system is employed in the dashpot. If arranged in the motor vehicle to arrest the final closing movement of the throttle valve, the stem 54 will be struck with a force of the spring return from the throttle valve operating linkage. This force is transmitted to plunger 42 through stem 54 and guide member 48 of plunger 42. Upon initial inward movement of plunger 42 air in chamber 28 passes through the restriction formed by orifice 98, the latter being made by the coaction of metering plug 90 and the walls of tapered groove 94. As the air passes through orifice 98 it enters chamber 26 and the movement of the plunger 42 is opposed by compression of the air in chamber 28 and is opposed yieldingly by spring 68. When the plunger 42 is permitted to return to the position of Figure 1, spring 68 pulls the plunger causing air to rush from chamber 26 to chamber 28 through a space opened between the wall 82 of plunger 42 and bead 80 of diaphragm 24. The bead 80 leaves the wall 82 because of a difference in air pressure between chambers 26 and 28, thus allowing a rapid return of plunger 42 to the position shown in Figure 1. A small amount of air returns to chamber 28 through orifice 98. It is essential that the plunger 42 return rapidly to the position shown in Figure 1, for applications on motor vehicle speed and/or load controls so that if the control is opened and closed quickly the plunger will be in the outward position to delay the closing of the control.

During all of these movements of the plunger 42, there is always at least two and sometimes three spaced places on the plunger that are guided. Guide members 48 and 50 are in guides 32 and 30 respectively and during a portion of the travel of plunger 42 the collar 97 provides a guiding function for the plunger. By virtue of the two guides at the ends of the plunger and aided by the third guide intermediate the ends of the plunger, the application of force to stem 54 is not near so critical as in prior dashpots. There can be no wabble of the plunger and no undesirable canting thereof in the hollow casing 12. This means that the diaphragm 24 is always flexed with equal forces around the periphery of bead 80. As previously mentioned the wall 82 which applies a force to the bead 80 of the diaphragm 24 is perpendicular to the path of normal travel of plunger 42. This also aids in the application of a direct force along a constant force plane normal to the path of travel of the plunger 42.

In constructing the plunger 42 with guide member 50 made hollow, the selection of orifice 98 size is obtained in the very easy way of merely inserting metering plug 90 a selected distance into the bore 52 of guide 50. Due to the taper of groove 94 the depth of penetration of the metering plug 90 will determine the orifice 98 size. Hence, in the event that improper metering is obtained, salvage is simple in that the plug 90 is relocated until proper metering is realized. In addition, the only thing necessary for fastening plug 90 firmly in place in the bore 52 is to have the molded plug and guide member 50 held to reasonable tolerance.

The foregoing is considered as illustrative only of the principles of the invention. The application of the invention may be in connection with any moving part whose movement should be retarded. Further, since numerous modifications and changes will readily occur to those skilled in the art, it is not desired to limit the invention to the exact construction and operation shown and described, and accordingly, all suitable modifications and equivalents may be resorted to, falling within the scope of the invention as claimed.

What is claimed as new is as follows:

1. In a fluid dashpot including a hollow casing, a diaphragm secured in said casing and separating said hollow casing into two chambers, a plunger in said casing connected with said diaphragm to flex the latter, said plunger having a passageway extending therethrough in which there is a tapered fluid metering groove, a smooth walled metering plug frictionally held in said passageway by binding against the walls thereof and coacting with said metering groove to provide a metered fluid orifice in said plunger whose effective area is selected by selecting the position of said plug in said passageway and in relation to said groove, and means on opposite sides of said diaphragm for constraining the movement of said plunger while it is being actuated so that there may be a deviation from alignment of the means which actuates the plunger and the plunger.

2. In a dashpot for use with a moving part, the combination of a hollow casing that has a pair of axially aligned guides at opposite ends, a plunger in said casing, means at opposite ends of said plunger and slidably disposed in said guides for constraining the movement of said plunger in said casing, a diaphragm connected to said casing and said plunger for separating said casing into two chambers, a passageway in said plunger connecting said chambers, said passageway having a wall in which there is a tapered metering groove, a plug coacting with said groove and movable to a selected fixed position on said wall to establish a selected size for an air orifice made by a part of said groove and said plug, means connected with a part of said means at the opposite ends of said plunger for displacing said plunger, and a return spring for said plunger located on the exterior of said casing and connected with said plunger displacing means.

3. The dashpot of claim 2 and a flexible dust shield disposed between said spring and the exterior of said casing so that any particles abraded from said dust shield are prevented by the shield from entering said casing.

4. The dashpot of claim 2 wherein said plunger and metering plug are made of a synthetic resin.

5. A dashpot comprising a hollow casing which includes a pair of covers, a diaphragm separating said casing into two chambers, means connecting the periphery of said diaphragm and confronting edges of said covers to assemble said covers with the diaphragm, a plunger with which said diaphragm is connected and disposed in said casing, axially aligned hollow members at the opposite ends of said plunger, a guide in each cover in which said members are operable to support said plunger on both sides of it during its movement, an intermediate guide in one of said covers and cooperable with said plunger during a part of the full movement of said plunger so that the application of force to move said plunger may vary in direction from direct alignment with the path of movement of said plunger, and means in said plunger for establishing communication between the chambers of said hollow casing.

6. A dashpot comprising a hollow casing which includes a pair of covers, a diaphragm separating said casing into two chambers, means connecting the periphery of said diaphragm and confronting edges of said covers to assemble said covers with the diaphragm, a plunger in said casing and having hollow members at its opposite ends and having said diaphragm connected thereto, a guide in each cover in which said members are operable to support said plunger on both sides of it during its movement so that the application of force to move said plunger may vary in direction from direct alignment with the path of movement of said plunger, a tapered metering groove in a wall of a first of said hollow members and establishing communication between said chambers, a plug in said first member and located at a selected position therein to obtain a selected effective area of orifice from said groove, a stem to move said plunger in one direction, and means fastening said stem in the other of said hollow members.

7. The dashpot of claim 6 wherein said plunger is made of a synthetic plastic material, and said means which fasten said stem in said hollow member includes a sharp projection on said stem which bites into the plastic material of said member.

8. In a closed circuit dashpot, a closed hollow casing, a plunger in said casing, a guide member protruding from said plunger, a guide in said casing in which said guide member is operable, a diaphragm connected to said casing and separating said casing into two chambers, said diaphragm having an opening, the portions of said diaphragm surrounding said opening fitting flush against a wall of said plunger and held in place by air pressure in a first of said chambers during the forward stroke of said plunger, said diaphragm portion being separated from said wall by pressure that is built up in a second of said chambers during the plunger return stroke and thereby establishing communication between said first and second chambers, and said plunger having a tapered groove establishing communication between said chambers, and a metering plug carried by one of said guides and selectively positionable in juxtaposition with said groove to select the effective orifice area of said tapered groove for flow between said chambers.

9. A dashpot adapted to be operatively connected to the speed and/or load control means of a motor vehicle to arrest the final closing movements of that means, said dashpot comprising a hollow casing, a diaphragm connected to and located in said casing and separating said casing into two chambers, a plunger mounted for reciprocatory movement in said casing, said diaphragm being connected with said plunger and movable a limited distance with respect thereto to communicate said chambers when said plunger is moving in one direction, said casing having guides at the opposite ends thereof, guide members constituting portions of said plunger and located in said guides to function as bearings for said plunger at two spaced places on said plunger, one of said guides having a bore, a tapered groove in said bore which intercommunicates said chambers, and a plug in said bore movable to a selected depth in the bore in order to select the orifice diameter formed by a part of said groove and said plug.

10. A dashpot adapted to be operatively connected to the speed and/or load control means of a motor vehicle to arrest the final closing movements of that means, said dashpot comprising a hollow casing, a diaphragm connected to and located in said casing and separating said casing into two chambers, a plunger mounted for reciprocatory movement in said casing and to which said diaphragm is movably connected, said casing having guides at the opposite ends thereof, guide members constituting portions of said plunger and located in said guides to function as bearings for said plunger at two spaced places on said plunger, one of said guides having a bore, a tapered groove in said bore which intercommunicates said chambers, a plug in said bore movable to a selected depth in the bore in order to select the orifice diameter formed by a part of said groove and said plug, said casing having an annular collar formed therein, said plunger having a shell intermediate said guide members and an annular part which constitutes a portion of said shell, and said annular part of said shell being slidably disposed in said collar when said plunger is in its extended position to further constrain the movement of said plunger to rectilinear motion.

11. In a dashpot that includes a hollowing casing, a diaphragm in said casing separating said casing into two chambers with an opening connecting said chambers, means for actuating said diaphragm including a stem having a sharp edge, a non-metal member to which said diaphragm is operatively connected and having a bore, said stem being held in said bore by said sharp edge biting into the plastic wall of said bore, a return spring reacting on said stem and said hollow casing, and a dust shield located between said return spring and said casing so that any particles abraded from said shield will not enter said casing but will fall harmlessly therefrom.

12. In a dashpot that includes a hollow casing, a diaphragm in said casing separating said casing into two chambers with an opening connecting said chambers, means for actuating said diaphragm including a stem, a return spring reacting on said stem and the exterior of said hollow casing, and a flexible dust shield located on the exterior of said casing between said return spring and said casing so that any particles abraded from said shield will not enter said casing but will fall harmlessly therefrom.

13. In a dashpot, a hollow casing, a diaphragm disposed in said casing and secured along its outer edge to said hollow casing thereby separating said casing into two chambers, a plunger disposed in said casing and operatively connected to said diaphragm, means for constraining the movement of said plunger in said casing, and means in said plunger and including a tapered groove with an adjustably located smooth walled plug therein for establishing communication between said chambers.

14. In a dashpot, a hollow casing, a diaphragm disposed in said casing and secured along its outer edge to said hollow casing thereby separating said casing into two chambers, a plunger disposed in said casing and operatively connected to said diaphragm, a passageway in said plunger which opens into each chamber, a wall of said passageway having a tapered groove, and a smooth wall plug frictionally held in said passageway in a selected position with respect to said groove thereby to select the effective area of said groove through which fluid must flow in passing through said passageway.

15. In a dashpot which includes a casing, a plunger movably mounted in said casing, a return spring reacting on said plunger, a diaphragm connected at its outer edge to said casing and separating said casing into two chambers, a wall on said plunger, said diaphragm having an opening in which said plunger is fitted, the portion of said diaphragm surrounding said opening having a resilient bead fitting against said wall of said plunger and held in place by air pressure when said plunger is moved in its forward stroke, a stop carried by said plunger and spaced from said wall against which said diaphragm portion bears when said plunger is being moved through its return stroke thereby forming a flow path between said chambers and enabling a rapid return of said plunger, and said diaphragm bead around said opening fitting with a clearance between the inner edge thereof and said plunger.

16. The dashpot of claim 15 wherein said plunger has a bore which interconnects said chambers, the side wall of said bore having a tapered slot, and a plug in said bore and overlying a selected part of said slot to provide a selected cross sectional area orifice through which the air must pass when traveling between chambers.

17. A dashpot to arrest the movement of a moving part, said dashpot comprising a hollow casing, a plunger mounted in said casing, a return spring reacting on said plunger and said casing, means operatively connected with said plunger and said casing for constraining the motion of said plunger in said casing, a diaphragm having its outer edges connected to said casing and coacting with said plunger to separate said casing into a first and a second chamber, a passageway extending through said plunger and establishing communication between said first and second chambers, said passageway having a wall in which there is a tapered metering groove, a plug disposed in said passageway and coacting with said groove and movable to a selected fixed position on said wall to establish a selected size of air orifice made by a part of said groove and said plug, whereby air is required to flow through said air orifice in response to movement of said plunger in said casing, said diaphragm having an opening, said plunger having a wall in a plane generally perpendicular to the path of travel of said plunger and against which the material of said diaphragm immediately surrounding said opening abuts and is held in place by air pressure built up in said first chamber in response to movement of said plunger in one direction in said casing, the edges of said opening in said diaphragm being spaced slightly from said plunger to provide for breathing space between said diaphragm and plunger, and said diaphragm being moveable in response to the return stroke motion of said plunger to a position separated from said wall of said plunger to admit air between said chambers thereby accelerating the return stroke of said plunger.

18. The dashpot of claim 17 wherein said plunger has aligned members protruding from the opposite ends thereof and in at least one of which said passageway extends, guides in said casing into which both of said members are fitted, said guides and said members constituting said means for constraining the travel of said plunger, and additional means located between said guides and in said casing for contacting another portion of said plunger when said plunger is in a part of one of said strokes for further guiding and constraining the movement of said plunger.

References Cited in the file of this patent

UNITED STATES PATENTS

| 431,387 | McHugh | July 1, 1890 |
| 527,585 | Blount | Oct. 16, 1894 |
| 1,714,708 | Winning | May 28, 1929 |
| 1,992,555 | Templin | Feb. 26, 1935 |
| 1,996,855 | Cheswright | Apr. 9, 1935 |
| 2,190,842 | Kuhn | Feb. 20, 1940 |
| 2,657,038 | Emerson | Oct. 27, 1953 |
| 2,680,610 | Harry | June 8, 1954 |